United States Patent
Lee et al.

(10) Patent No.: US 12,334,599 B2
(45) Date of Patent: Jun. 17, 2025

(54) BATTERY MODULE AND ENERGY STORAGE DEVICE

(71) Applicant: LG ENERGY SOLUTION, LTD., Seoul (KR)

(72) Inventors: Chang Bog Lee, Daejeon (KR); Sung Won Kim, Daejeon (KR); Jae Chan Lee, Daejeon (KR); Hyeon Jin Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 553 days.

(21) Appl. No.: 17/776,677

(22) PCT Filed: Apr. 2, 2021

(86) PCT No.: PCT/KR2021/004101
§ 371 (c)(1),
(2) Date: May 13, 2022

(87) PCT Pub. No.: WO2021/206373
PCT Pub. Date: Oct. 14, 2021

(65) Prior Publication Data
US 2022/0399619 A1    Dec. 15, 2022

(30) Foreign Application Priority Data
Apr. 10, 2020    (KR) .......... 10-2020-0044257

(51) Int. Cl.
*H01M 50/583*    (2021.01)
*H01H 37/76*    (2006.01)
*H01M 50/204*    (2021.01)

(52) U.S. Cl.
CPC .......... *H01M 50/583* (2021.01); *H01H 37/76* (2013.01); *H01M 50/204* (2021.01); *H01M 2200/103* (2013.01)

(58) Field of Classification Search
None
See application file for complete search history.

(56) References Cited

U.S. PATENT DOCUMENTS

2012/0319658 A1    12/2012    White
2013/0260191 A1    10/2013    Takahashi et al.
(Continued)

FOREIGN PATENT DOCUMENTS

CN    105006867 A    10/2015
CN    110492453 A    11/2019
(Continued)

OTHER PUBLICATIONS

Machine Translation of JP 2019-022359 (Year: 2019).*
International Search Report (PCT/ISA/210) issued in PCT/KR2021/004101 mailed on Jul. 19, 2021.

*Primary Examiner* — Wyatt P McConnell
(74) *Attorney, Agent, or Firm* — Birch, Stewart, Kolasch & Birch, LLP (57) ABSTRACT

A battery module and an energy storage device including a battery rack including a plurality of battery modules, and a rack fuse cutting off a circuit when an overcurrent occurs in the battery rack, each of the plurality of battery modules includes a battery cell and a module fuse that cuts off a circuit when an overcurrent occurs in the battery module, the module fuse has a voltage specification capable of corresponding to an output voltage of the battery rack, and has a short circuit specification lower than a short circuit specification of the rack fuse.

16 Claims, 5 Drawing Sheets

(56) References Cited

U.S. PATENT DOCUMENTS

| | | |
|---|---|---|
| 2015/0182783 A1 | 6/2015 | Kimura et al. |
| 2016/0064965 A1 | 3/2016 | White et al. |
| 2017/0310132 A1 | 10/2017 | Hohmann et al. |
| 2019/0334142 A1 | 10/2019 | Kwon et al. |
| 2020/0171657 A1 | 6/2020 | Baier et al. |
| 2021/0075218 A1 | 3/2021 | Cao et al. |

FOREIGN PATENT DOCUMENTS

| | | |
|---|---|---|
| JP | 2011-243382 A | 12/2011 |
| JP | 2013-206642 A | 10/2013 |
| JP | 2015-111980 A | 6/2015 |
| JP | 5750739 B2 | 7/2015 |
| JP | 6098411 B2 | 3/2017 |
| JP | 2017-158268 A | 9/2017 |
| JP | 2018-147804 A | 9/2018 |
| JP | 2019-22359 A | 2/2019 |
| JP | 2019-88489 A | 6/2019 |
| KR | 10-2008-0015215 A | 2/2008 |
| KR | 10-2015-0038990 A | 4/2015 |
| KR | 10-2016-0142303 A | 12/2016 |
| KR | 10-2019-0124482 A | 11/2019 |
| KR | 10-2020-0000990 A | 1/2020 |
| WO | 2012/173993 A1 | 12/2012 |
| WO | 2015/156019 A1 | 10/2015 |
| WO | WO2019/008075 A1 | 1/2019 |

\* cited by examiner

BATTERY MODULE AND ENERGY STORAGE DEVICE

CROSS-REFERENCE TO RELATED APPLICATIONS

This application claims the benefit of Korean Patent Application No. 10-2020-0044257 filed on Apr. 10, 2020, in the Korean Intellectual Property Office, the disclosure of which is incorporated herein in its entirety by reference.

TECHNICAL FIELD

Embodiments of the present invention relate to a battery module and an energy storage device, and more particularly, to a battery module and an energy storage device provided with a fuse for blocking overcurrent.

BACKGROUND ART

Recently, with the spread of electronic devices such as smartphones and electric vehicles, and the spread of infrastructure for Energy Storage System (ESS), research on secondary batteries as a power supply source has been actively conducted.

In the case of ESS, large amounts of electric energy are necessary to be stored, and also high power is required. Accordingly, in the ESS, the secondary battery is provided in the form of a battery rack including a plurality of battery modules and a rack controller that manages the plurality of battery modules. Each of the plurality of battery modules further includes a battery pack in which a plurality of battery cells are connected in series and/or in parallel, and a module controller that manages the operation of the battery pack.

Since a short circuit in the ESS can lead to a major accident such as a fire, various configurations are provided to block such a short circuit for safety. Currently, a fuse as a passive element is connected in a battery system such as an ESS. When a short circuit occurs, the overcurrent is cut off in a short moment through a fuse to prepare for a short circuit accident.

The fuse in the battery rack has a structure that cannot cope with a short circuit at the module level. Therefore, a module fuse is also provided in the battery system to satisfy the UN Transportation Testing (UN/DOT 38.3) standard. UN/DOT 38.3 is a test regulation to ensure safety in transportation of lithium-ion batteries. UN/DOT 38.3 contains the content that protection against short circuits of the module is required when the battery is transported in a module state, and a module fuse is provided to satisfy this. In relation to the module fuse, a fuse having a voltage specification that satisfies the module voltage is selected so that there is no problem in the short-circuit test of the installed battery module.

However, in the case where a short circuit occurs in the battery rack after the battery module is finally mounted in the battery rack, if the module fuse operates before the rack fuse and is melted, there is a possibility that the system voltage, that is, the output voltage of the battery rack, will be caught by the module fuse. In this case, the module fuse cannot withstand the system voltage and may be damaged and other components may also be damaged.

DISCLOSURE OF THE INVENTION

Technical Problem

Embodiments of the present invention have been made to solve the above problems, and an object of the present invention is to provide a battery module and an energy storage device in which price competitiveness and energy density are prevented from being deteriorated while being safe.

Technical Solution

In order to solve the above technical problem, according to an aspect of the embodiments of the present invention, an energy storage device includes: a battery rack including a plurality of battery modules; and a rack fuse connected in series to the plurality of battery modules and configured to cut off a battery rack circuit when an overcurrent occurs in the battery rack, wherein each of the plurality of battery modules includes a battery cell and a module fuse that cuts off a battery module circuit when an overcurrent occurs in the battery module, wherein the module fuse has a voltage specification capable of corresponding to an output voltage of the battery rack, and has a short circuit specification lower than a short circuit specification of the rack fuse.

According to another feature of this embodiment, the module fuse may be cut off later than the rack fuse when a short circuit occurs in the battery rack.

According to another feature of this embodiment, the module fuse may cut off only the rack fuse when a short circuit occurs in the battery rack.

According to another feature of this embodiment, when a short circuit occurs in the battery rack, the module fuse may start to melt later than when the rack fuse is completely melted.

According to another feature of this embodiment, when a short circuit occurs in the battery rack and the rack fuse is cut off, the module fuse may not operate.

According to another feature of this embodiment, when a short circuit occurs in the battery module, the module fuse may be cut off.

In order to solve the above technical problem, according to another aspect of the embodiments of the present invention, a battery module in an energy storage used with a plurality of battery modules in a battery rack and including a rack fuse that connected in series to the plurality of battery modules and cuts off a battery rack circuit when an overcurrent occurs includes: a plurality of battery cells; and a module fuse configured to cut off a battery module circuit when overcurrent occurs in the battery module, wherein the module fuse has a voltage specification capable of corresponding to an output voltage of the battery rack, and has a short circuit specification lower than a short circuit specification of the rack fuse.

According to another feature of this embodiment, when a short circuit occurs in the battery rack, the module fuse may start to melt later than when the rack fuse is completely melted.

According to another feature of this embodiment, when a short circuit occurs in the battery module, the module fuse may be cut off.

Effects of the Invention

Due to the configuration as described above, it is possible to provide a battery module and an energy storage device in which price competitiveness and energy density are prevented from being deteriorated while being safe.

MODE FOR CARRYING OUT THE INVENTION

Hereinafter, various embodiments of the present invention will be described in detail with reference to the accompanying drawings. In this document, the same reference numerals are used for the same components in the drawings, and duplicate descriptions of the same components are omitted.

For the various embodiments of the present invention disclosed in this document, specific structural or functional descriptions have been exemplified for the purpose of describing the embodiments of the present invention only and various embodiments of the present invention may be implemented in various forms and should not be construed as being limited to the embodiments described in this document.

Expressions such as "first", "second", "first", or "second" used in various embodiments may modify various elements regardless of their order and/or importance, and do not limit the corresponding elements. For example, without departing from the scope of the present invention, a first component may be referred to as a second component, and similarly, a second component may be renamed and referred to as a first component.

Terms used in this document are only used to describe a specific embodiment, and may not be intended to limit the scope of other embodiments. The terms of a singular form may include plural forms unless otherwise specified.

Figure 1:
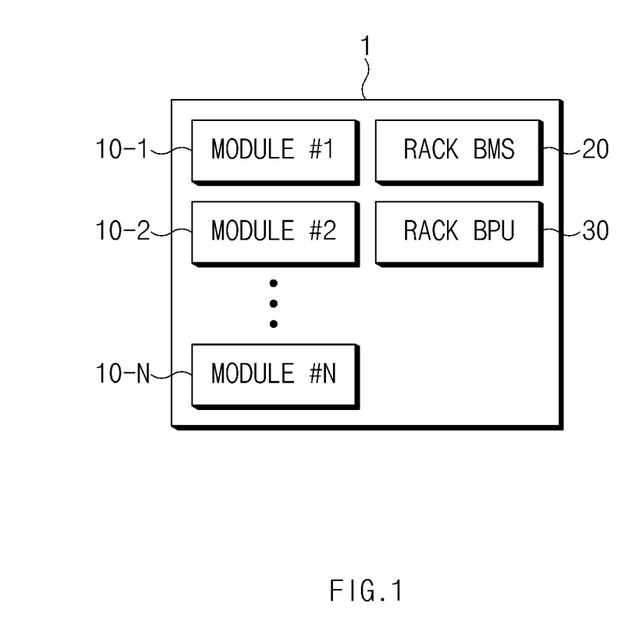
FIG. 1 is a diagram showing the configuration of an energy storage device according to an embodiment of the present invention.

FIG. 1 is a diagram showing the configuration of an energy storage device according to an embodiment of the present invention.

Referring to FIG. 1, an energy storage device 1 is a unit that stores energy in an energy storage system. The energy storage system may be configured including a plurality of energy storage devices 1. The energy storage device 1 is provided in the form of a battery rack. The battery rack is equipped with a plurality of battery modules 10 and a rack controller that controls the entire battery rack at the chassis. Hereinafter, an energy storage device and a battery rack may be used in combination.

The energy storage device 1 may include a battery module made of a rechargeable and dischargeable secondary battery. The energy storage device 1 may supply stored power to a load or to a system. In addition, the energy storage device 1 may be charged by receiving power from the system.

As shown in FIG. 1, the energy storage device 1 may include a plurality of battery modules 10-1 to 10-N, a rack controller (Rack Battery Management System (RBMS)), and a Rack Battery Protection unit (RBPU), and the like.

The plurality of battery modules 10-1 to 10-N are unit components that can be mounted on the energy storage device 1, and each of the plurality of battery modules 10-1 to 10-N is configured to charge and discharge electric power. (In the following, when there is no need to separate and describe a plurality of battery modules, reference numerals will be described as 'battery module 10'.) The battery module 10 is a component that can be transported by itself before being assembled into a battery rack as the energy storage device 1. The plurality of battery modules 10 may be connected in series and/or parallel to each other within the energy storage device 1 according to the required specifications of the energy storage device 1. That is, the plurality of battery modules 10 may provide a required output according to a series and/or parallel connection configuration.

Figure 2:
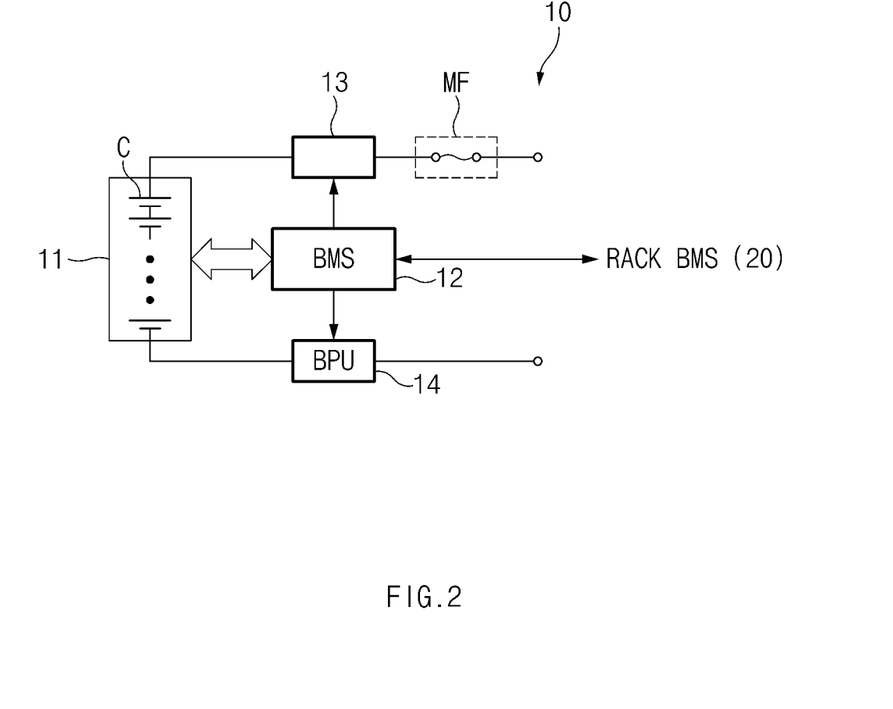
FIG. 2 is a diagram showing the configuration of a battery module according to an embodiment of the present invention.

Each of the battery modules 10 may include a battery pack 11, a module controller 12, a switching unit 13, and a module battery protection unit (BPU) 14. FIG. 2 is a diagram showing the configuration of a battery module according to an embodiment of the present invention.

Referring to FIG. 2, the battery pack 11 may include one or more battery cells C, which are unit components for storing power. A plurality of battery cells may be connected in series and/or parallel to each other according to the required specifications of the battery pack 11. That is, the number and connection type of the battery cells C may be determined according to the required output (voltage, current, etc.) of the battery module 10. The battery cell C may be a lithium ion (Li-ion) battery, a lithium ion polymer (Li-ion polymer) battery, a nickel cadmium (Ni—Cd) battery, a nickel hydrogen (Ni-MH) battery, and the like. If it is a rechargeable battery, it is not limited thereto.

The module controller 12 (or "module BMS") controls and manages the overall operation of the battery module 10. The module controller 12 may detect the temperature of the battery module 10 and the voltage and current output from the battery module 10. The battery module 10 may calculate parameters such as SOC, that is, a charged state, or SOH indicating a degree of deterioration from values such as temperature, voltage, and current detected through direct measurement or reception from the outside. For detection of voltage, current, temperature, and the like, the module controller 12 may provide a measuring means such as a sensor at an appropriate position in the battery module 10 or the energy storage device 1.

The module controller 12 may transmit values such as temperature, voltage, and current, or calculated values such as SOC and SOH, to an external device. The external device may be an upper-level controller, and in this embodiment, may transmit values such as detected temperature, voltage, current, and the like, or values such as calculated SOC and SOH, and the like to the rack controller 20 (rack battery management system (BMS)) that manages the energy storage device 1.

The module controller 12 may execute a computer program to control and manage the overall operation of the battery module 10 and may include various components such as a microcomputer as a controller for controlling the entire operation of the module controller 12, a memory for storing a computer program required for the operation of the module controller 12, an input/output device such as sensors and measuring means, a communication device for communicating with an external device, and other peripheral circuits.

The switching unit 13 may be a device that supplies power to a system or a load or receives power from a system when charging or discharging the battery module 10. The switching unit 13 may be a relay or a contactor. The operation of the switching unit 13 may be controlled by the module controller 12.

The module BPU 14 may include components for stable operation of the battery module 10. The module BPU 14 may include cooling means such as a cooling fan for controlling the temperature in the battery module 10. In addition, the module BPU 14 may include a module fuse MF for cutting off a current path when an overcurrent occurs due to a short circuit or the like. That is, the battery module 10 may include a module fuse MF that cuts off a circuit when an overcurrent occurs.

When an overcurrent flows through the battery module 10, the module fuse MF is melted by heat generated by electric energy. When the module fuse MF is melted to block the flow of current, a predetermined voltage is applied therebetween. In addition, the module fuse MF must be able to withstand a predetermined voltage applied to both ends after melting. Specific specifications and characteristics of the module fuse MF will be described later.

The rack controller 20 may control a relay for charging to a battery rack or discharging from a battery rack to a system or a load. The rack controller 20 may monitor various parameters (e.g., voltage, current, temperature, etc.) in the battery rack and control each protection means in the rack BPU 30 based on the result.

The rack controller 20 may communicate with the module controller 12 included in each of the plurality of battery modules 10 included in the battery rack. The rack controller 20 may receive data on the state of the battery pack 11 from the module controller 12 and control protection means in the rack BPU 30 based thereon. In addition, the rack controller 20 may transmit a control signal for controlling the operation of the battery module 10 to the module controller 12 based on data from the module controller 12. The rack controller 20 may communicate with the plurality of module controllers 12 by wire and/or wirelessly.

Like the module BPU 14, the rack BPU 30 may include components for stable operation of the battery rack. The rack BPU 30 may include cooling means such as a cooling fan for controlling the temperature in the battery rack. In addition, the rack BPU 30 may include a rack fuse REF for cutting off a current path when an overcurrent occurs due to a short circuit or the like. That is, the energy storage device 1 may include a rack fuse RF that cuts off a circuit when an overcurrent occurs in the battery rack. Specific specifications and characteristics of the rack fuse (RF) will be described later.

Figure 3:
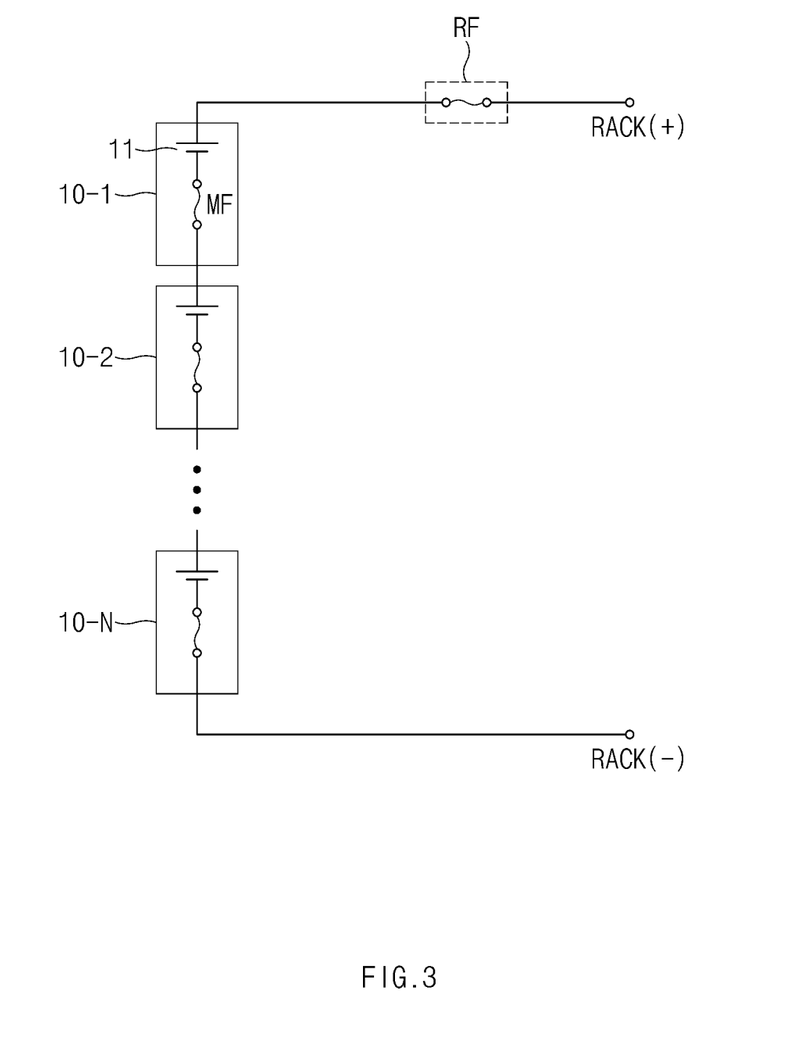
FIG. 3 is a schematic circuit diagram of an energy storage device according to an embodiment of the present invention.

In the energy storage device 1 configured as described above, at least some of the plurality of battery modules 10 and the rack fuse RF are connected in series with each other. FIG. 3 is a schematic circuit diagram of an energy storage device 1 according to an embodiment of the present invention.

Referring to FIG. 3, at least some of the battery modules 10-1 to 10-N among the plurality of battery modules 10 are connected in series with each other, and the rack fuse RF is connected in series to the battery modules 10-1 to 10-N connected in series. RACK(+) and RACK(−) represent the output terminals of the battery rack. In FIG. 3, for convenience of explanation, only one battery cell is illustrated as the battery pack 11, and only the battery pack 11 and the module fuse MF are illustrated.

In the energy storage device 1 configured as shown in FIG. 3, a case where a short circuit occurs in the battery rack or a case where a short circuit occurs in the battery module 10 may be assumed.

Conventionally, a fuse having a specification capable of withstanding the output voltage of a battery module was used as a module fuse in order to satisfy the UN/DOT 3.83 regulations. For example, in the case of a battery module that outputs a voltage of about 50 VDC to about 100 VDC, a fuse capable of withstanding a voltage of about 120 VDC to about 150 VDC was used. However, such a module fuse uses a commercial product, and the fuse used has a short circuit specification capable of passing a current of about 20 kA.

However, in the case of a conventionally used module fuse, it was possible to protect the battery module against module short circuits that occur when the battery modules are individually used or transported, but there is a problem in that the battery module cannot be protected against a module short circuit that occurs while a plurality of battery modules are mounted on the battery rack.

Therefore, there is a need for a method to protect the battery module not only when the battery module is used individually, but also when it is mounted in a battery rack. Also, as the specification of the fuse increases, the volume and price increase. Therefore, it should be considered that the energy density does not decrease due to the volume without deteriorating the price competitiveness of the battery module.

In the module fuse MF according to the present embodiment, a fuse having a specification capable of corresponding to a voltage (battery rack output voltage) output from the energy storage device 1 is used. The module fuse MF may have the same specification as the voltage specification of the rack fuse RF.

When a short circuit occurs while the plurality of battery modules 10 are mounted on the battery rack, the voltage applied to the module fuse MF may vary. At this time, when a short circuit occurs in the battery rack, if the uppermost module fuse MF melts first, a voltage close to the system voltage may be applied across the module fuse MF (see FIG. 5). For example, a voltage of about 1,000 voltage DC (VDC) to about 1500 VDC may be applied across the module fuse MF. Accordingly, the module fuse MF selects a fuse having a voltage specification capable of withstanding a system voltage, not a voltage specification capable of withstanding 50 VDC to 100 VDC, which is an output voltage of a battery module as in the prior art.

On the other hand, the module fuse MF according to the present embodiment has a short circuit specification lower than that of the rack fuse RF. As described above, as the specification of the fuse increases, the volume and price increase. Therefore, the module fuse MF has a short circuit specification lower than the short circuit specification applied to the rack fuse RF installed in the energy storage device 1.

In a fuse, the voltage specification and the short circuit specification have a trade-off relationship with each other. That is, instead of selecting a higher voltage specification than the conventional one in the module fuse MF, an increase in price and volume can be suppressed by lowering the short circuit specification.

As an additional embodiment, the module fuse MF may be configured to be cut off later than the rack fuse RF when a short circuit occurs in the battery rack. The cutting off speed of the module fuse MF and the rack fuse RF may be adjusted by appropriately selecting a component, thickness, and length of the melted part of the fuse. That is, when a short circuit occurs in the battery rack, the rack fuse RF is cut off before the module fuse MF so that even if the short circuit specification of the module fuse MF is lowered, the battery module 10 may be safely protected.

Preferably, the module fuse MF may be configured to cut off only the rack fuse RF when a short circuit occurs in the battery rack. More preferably, when a short circuit occurs in the battery rack, the module fuse MF may be configured to start to melt later than when the rack fuse RF is completely melted. More preferably, when a short circuit occurs in the battery rack and the rack fuse RF is cut off, the module fuse MF may be configured not to operate at all.

That is, when a short circuit occurs in the battery rack, the module fuse MF does not operate at all, and only the rack fuse RF operates, such that it is possible to prevent a situation in which the module fuse MF must be replaced unnecessarily.

Figure 4:
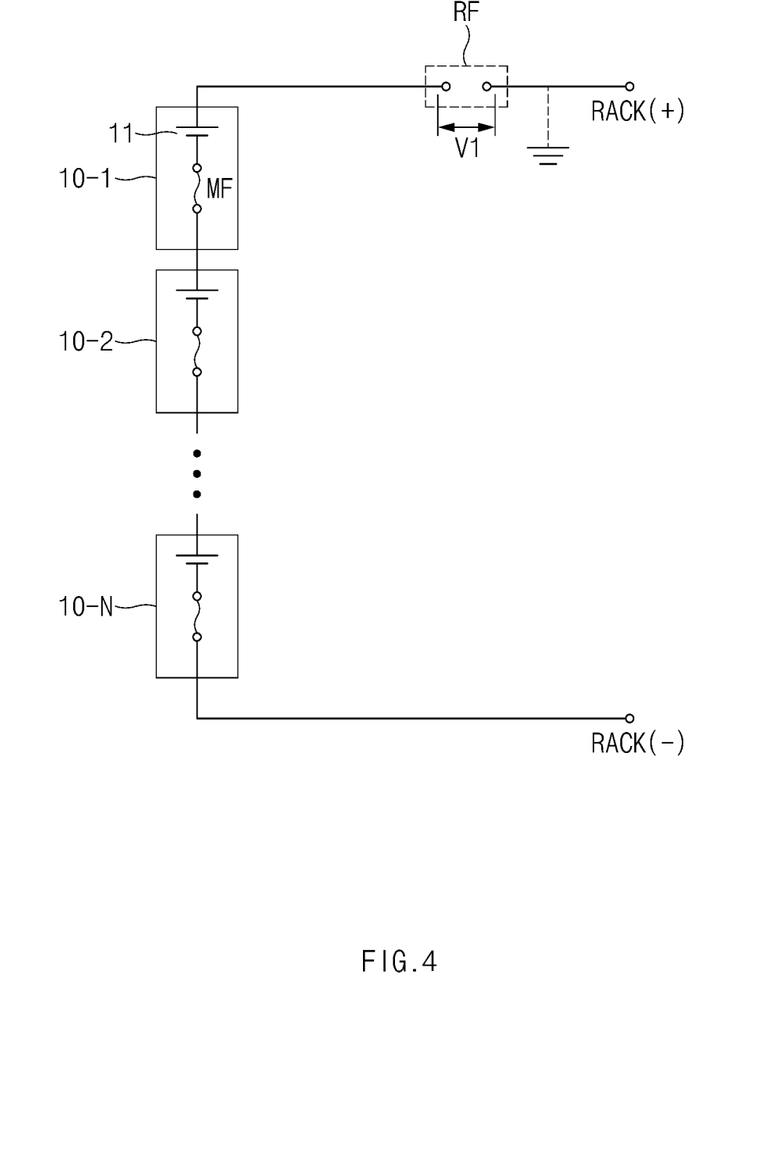
FIG. 4 is a diagram illustrating an example in which a short circuit occurs in an energy storage device according to FIG. 3.

FIG. 4 is a diagram illustrating an example in which a short circuit occurs in the energy storage device 1 according to FIG. 3. In this example, as described above, a case in which a short circuit occurs in the battery rack is shown.

As shown in FIG. 4, when a node between the rack fuse RF and the output terminal RACK(+) is shorted to ground, the rack fuse RF melts to cut off the current path. In addition, a voltage V1 corresponding to the system voltage is applied to both ends of the rack fuse RF. Since the rack fuse RF has a voltage specification that can withstand the system voltage, further damage does not occur even after the circuit is cut off.

In addition, when a short circuit occurs in the battery rack, the module fuse MF does not operate. Since the rack fuse RF is cut off and no current flows, a load is not applied to the module fuse MF, and thus the battery module 10 is also maintained in a safe state.

Next, a case where a short circuit occurs in the battery module 10 side rather than the battery rack will be described.

When a short circuit occurs in the battery module 10, the module fuse MF melts to cut off the circuit. In this case, the rack fuse RF will not operate. When the module fuse MF is melted due to a short circuit of the battery module 10, the voltage applied to the module fuse MF may vary. In the example of FIG. 3, when a short circuit occurs near the lowermost battery module 10-N, the output voltage of the battery module 10 is applied across both ends of the module fuse MF. On the other hand, in the example of FIG. 3, when a short circuit occurs near the uppermost battery module 10-1, the system voltage is applied to both ends of the module fuse MF.

Figure 5:
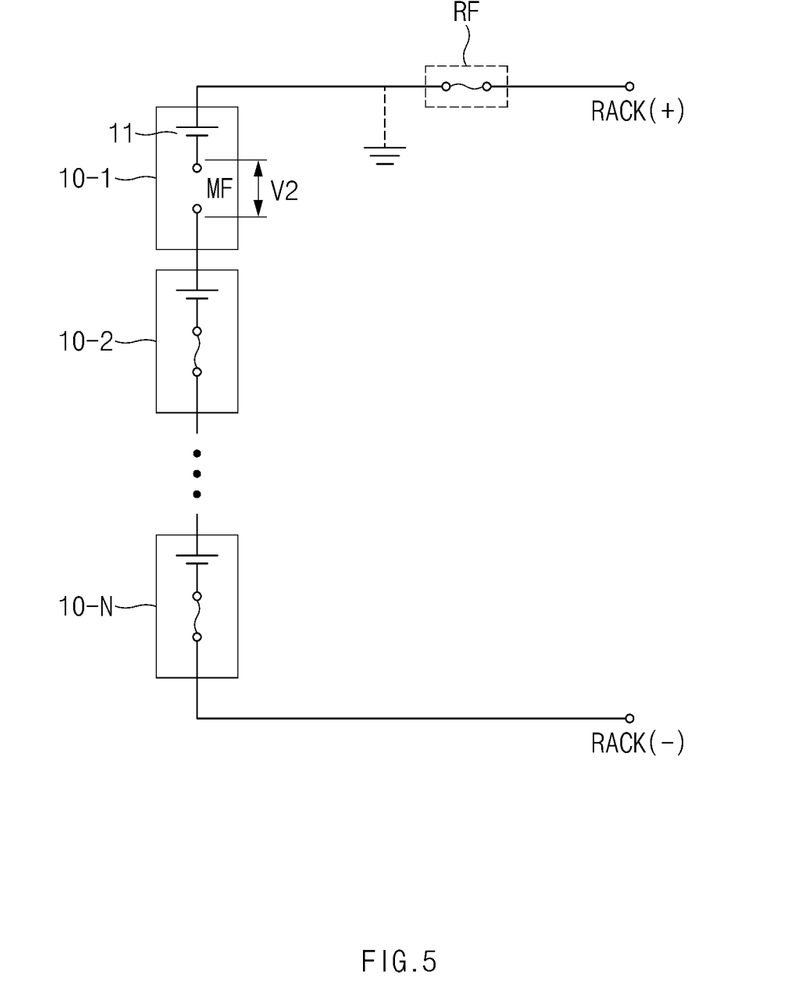
FIG. 5 is a diagram illustrating another example in which a short circuit occurs in an energy storage device according to FIG. 3.

FIG. 5 is a diagram illustrating another example in which a short circuit occurs in the energy storage device 1 according to FIG. 3. In this example, as described above, a case in which a short circuit occurs in the uppermost battery module 10-1 of the battery modules 10 is illustrated.

As shown in FIG. 5, when a node between the battery module 10-1 and the rack fuse RF is shorted to ground, the module fuse MF melts to cut off the current path. In addition, a voltage V2 close to the system voltage is applied across both ends of the module fuse MF. However, since the module fuse MF according to the embodiments of the present invention has a voltage specification capable of withstanding the system voltage, further damage does not occur even after the circuit is cut off. Therefore, the battery module 10 is maintained in a safe state.

As described above, the module fuse MF provided in the battery module 10 has a voltage specification equal to the voltage specification of the rack fuse RF, and has a short circuit specification lower than the short circuit specification of the rack fuse RF. With such a configuration, it is possible to safely cope with not only the case of operating the battery module 10 individually, but also the module short circuit occurring in the battery module 10 in a battery rack state.

Terms such as "include", "consist of" or "have" described above mean that the corresponding constituent components can be present unless otherwise stated, and it should be construed that other components may be further included rather than excluding other components. All terms including technical or scientific terms may be interpreted as having the same meaning as commonly understood by one of ordinary skill in the art, unless otherwise defined. Terms commonly used, such as terms defined in the dictionary, should be interpreted as being consistent with the meaning of the context of the related technology, and unless explicitly defined in the present invention, they are not interpreted in an ideal or excessively formal sense.

The above description is merely illustrative of the technical idea of the present invention, and those of ordinary skill in the art to which the present invention pertains will be able to make various modifications and variations without departing from the essential characteristics of the present invention. Therefore, the embodiments disclosed in the present invention are not intended to limit the technical idea of the present invention, but to explain, and the scope of the technical idea of the present invention is not limited by these embodiments. The scope of protection of the present invention should be interpreted by the claims below, and all technical ideas within the scope equivalent thereto should be construed as being included in the scope of the present invention.

The invention claimed is:

1. An energy storage device comprising:
 a battery rack including a plurality of battery modules; and
 a rack fuse connected in series to the plurality of battery modules and configured to cut off a battery rack circuit when an overcurrent occurs in the battery rack,
 wherein each of the plurality of battery modules comprises a battery cell and a module fuse that cuts off a battery module circuit when an overcurrent occurs in the battery module,
 wherein the module fuse has a voltage specification capable of corresponding to an output voltage of the battery rack, and has a short circuit specification lower than a short circuit specification of the rack fuse, and
 wherein the rack fuse is cut off to withstand a first voltage that corresponds to a system voltage when a node between the rack fuse and a positive output terminal is shorted to ground.

2. The energy storage device of claim 1, wherein the module fuse is cut off later than the rack fuse when a short circuit occurs in the battery rack.

3. The energy storage device of claim 2, wherein the module fuse does not cut off and the rack fuse cuts off when the short circuit occurs in the battery rack.

4. The energy storage device of claim 3, wherein when the short circuit occurs in the battery rack, the module fuse starts to melt later than when the rack fuse is completely melted.

5. The energy storage device of claim 3, wherein when the short circuit occurs in the battery rack and the rack fuse is cut off, the module fuse does not operate.

6. The energy storage device of claim 1, wherein when a short circuit occurs in the battery module, the module fuse is cut off.

7. A battery module in an energy storage device used with a plurality of battery modules in a battery rack and including a rack fuse connected in series to the plurality of battery modules and that cuts off a battery rack circuit when an overcurrent occurs, each battery module comprising:
 a plurality of battery cells; and
 a module fuse configured to cut off a battery module circuit when overcurrent occurs in the battery module,
 wherein the module fuse has a voltage specification capable of corresponding to an output voltage of the battery rack, and has a short circuit specification lower than a short circuit specification of the rack fuse, and wherein the module fuse is cut off to withstand a second voltage that is less than a system voltage when a node between the rack fuse and the plurality of battery modules is shorted to ground.

8. The battery module of claim 7, wherein when a short circuit occurs in the battery rack, the module fuse starts to melt later than when the rack fuse is completely melted.

9. The battery module of claim 7, wherein when a short circuit occurs in the battery module, the module fuse is cut off.

10. The battery module of claim 7, wherein the rack fuse is cut off to withstand a first voltage that corresponds to the system voltage when a node between the rack fuse and a positive output terminal is shorted to ground.

11. The battery module of claim 7, wherein the plurality of battery cells are connected in series.

12. The energy storage device of claim 1, wherein at least one module fuse of at least battery module of the plurality of battery modules is cut off to withstand the second voltage that is less than the system voltage when the node between the rack fuse and the plurality of battery modules is shorted to ground.

13. The battery module of claim 7, wherein the plurality of battery modules are connected in series.

14. The energy storage device of claim 1, wherein each of the plurality of battery modules further includes a switching unit configured to control supplying power to the battery module.

15. The energy storage device of claim 1, wherein each of the plurality of battery modules further includes a module battery protector configured to control a temperature of the battery module.

16. The energy storage device of claim 1, wherein the plurality of battery modules are connected in series.

* * * * *